United States Patent [19]

Jenkner

[11] Patent Number: 5,653,921
[45] Date of Patent: Aug. 5, 1997

[54] METHOD FOR PRODUCING SHOCK ATTENUATION DEVICE

[76] Inventor: Brian D. Jenkner, 22318 Carmack, Marengo, Ill. 60152

[21] Appl. No.: 405,376

[22] Filed: Mar. 15, 1995

Related U.S. Application Data

[60] Continuation of Ser. No. 932,104, Aug. 19, 1992, abandoned, which is a division of Ser. No. 769,618, Oct. 1, 1991, abandoned.

[51] Int. Cl.⁶ ................................................. B29C 39/10
[52] U.S. Cl. ............................................................ 264/4
[58] Field of Search ........................... 264/4; 428/402.2, 428/402.21, 402.22

[56] References Cited

U.S. PATENT DOCUMENTS

| | | |
|---|---|---|
| 2,435,950 | 2/1948 | Neher et al. . |
| 3,343,833 | 9/1967 | Fader . |
| 3,424,448 | 1/1969 | Ma . |
| 3,548,420 | 12/1970 | Spence . |
| 3,549,472 | 12/1970 | King . |
| 3,661,815 | 5/1972 | Smith . |
| 3,724,106 | 4/1973 | Magidson . |
| 3,886,125 | 5/1975 | Chromecek . |
| 3,900,378 | 8/1975 | Yen et al. . |
| 3,901,236 | 8/1975 | Assarsson et al. . |
| 3,914,881 | 10/1975 | Striegel . |
| 3,948,841 | 4/1976 | Dusek . |
| 3,992,801 | 11/1976 | Zente . |
| 4,017,931 | 4/1977 | Golden . |
| 4,055,180 | 10/1977 | Karami . |
| 4,072,635 | 2/1978 | Jeram . |
| 4,090,013 | 5/1978 | Ganslaw et al. . |
| 4,104,214 | 8/1978 | Meierhoefer . |
| 4,124,116 | 11/1978 | McCabe, Jr. . |
| 4,167,502 | 9/1979 | Lewis et al. . |
| 4,272,422 | 6/1981 | Tanaka . |
| 4,292,972 | 10/1981 | Pawelchak et al. . |
| 4,310,593 | 1/1982 | Gross . |
| 4,340,057 | 7/1982 | Bloch et al. . |
| 4,366,206 | 12/1982 | Tanaka . |
| 4,370,768 | 2/1983 | Saloff . |
| 4,381,320 | 4/1983 | Nguyen . |
| 4,401,795 | 8/1983 | Herman et al. . |
| 4,402,335 | 9/1983 | Kemmler . |
| 4,416,790 | 11/1983 | Schurmann et al. . |
| 4,466,634 | 8/1984 | Johnson et al. . |
| 4,497,930 | 2/1985 | Yamasaki et al. . |
| 4,507,438 | 3/1985 | Obayashi et al. . |
| 4,529,739 | 7/1985 | Scott et al. . |
| 4,567,677 | 2/1986 | Zona . |
| 4,650,716 | 3/1987 | Gelman . |
| 4,725,628 | 2/1988 | Garvey et al. . |
| 4,725,629 | 2/1988 | Garvey et al. . |
| 4,731,391 | 3/1988 | Garvey . |
| 4,749,392 | 6/1988 | Aoki et al. . |
| 4,768,295 | 9/1988 | Ito . |
| 4,798,603 | 1/1989 | Meyer et al. . |
| 4,802,289 | 2/1989 | Guldager . |
| 4,838,885 | 6/1989 | Bernardin . |
| 4,838,947 | 6/1989 | Levy et al. . |
| 4,942,634 | 7/1990 | Saloff et al. . |
| 4,988,344 | 1/1991 | Reising et al. . |
| 4,994,037 | 2/1991 | Bernardin . |
| 5,013,309 | 5/1991 | Baigas, Jr. et al. . |

FOREIGN PATENT DOCUMENTS

| | | | |
|---|---|---|---|
| 321063 | 6/1989 | European Pat. Off. . | |
| 53-47822 | 12/1978 | Japan | 264/4 |
| 57-135853 | 8/1982 | Japan . | |
| 655525 | 7/1951 | United Kingdom | 264/4 |

OTHER PUBLICATIONS

Klucel Hydroxypropylcellulose, Physical and Chemical Properties, Feb. 1991, Aqualon Co., 2711 Centerville Rd., Wilmington, DE 19850.

Klucel Hydroxypropylcellulose, NF Grad for Pharmaceutical Uses, May 1990, Aqualon Co., 2711 Centerville Rd., Wilmington, DE 19850.

The Sharper Image Store, Oct. 1991, p. 9, The Sharper Image, 650 Davis Street, San Francisco, CA 94111.

ASIC Gel, undated, advertising publication, ASICS Tiger Corp., 10540 Talbert Ave., West Bldg., Tautan Valley, CA 92708.

Product Data Sheet, undated, Water Lock 100 Series, Grain Processing Corporation, 1600 Oregan Street, Muscatine, Iowa 52761.

Material Safety Data Sheet, Apr. 4, 1991, Water Lock 100 Series, Grain Processing Corporation, 1600 Oregan Street, Muscatine, Iowa 52761.

Material Data Safety Sheet, Mar. 31, 1991, Klucel Hydroxypropylcelluse, Aqualon Co., 2711 Centerville Rd., Wilmington, DE 19850.

*Primary Examiner*—Mathieu D. Vargot
*Attorney, Agent, or Firm*—Juettner Pyle Lloyd & Piontek

[57] ABSTRACT

A super absorbent material in combination with a liquid to form a thick, viscous gel-like colloidal fluid of high durability, low cost, and ready manufacture for use in footwear, medical applications, including surgical padding, flotation sleeping devices, and other applications for the dissipation of shock or load over time and/or an area is disclosed. Additionally, a process for the manufacture and use of same for use within a resilient member or articulate structure as the shock absorbing and load distribution material is recited.

4 Claims, No Drawings

METHOD FOR PRODUCING SHOCK ATTENUATION DEVICE

This is a continuation of application Ser. No. 07/932,104, filed on Aug. 19, 1992, now abandoned, which is a divisional of application Ser. No. 07/769,618, filed on Oct. 1, 1991, now abandoned.

BACKGROUND OF THE INVENTION

1. Field of the Invention

The present invention relates to a material and methods for the manufacture and use of same usable in a device to attenuate shock loads and distribute loading and, more particularly, to an improved shock attenuating and/or load distribution material for a device having an outer membrane or displacable structure wherein the material is a viscous colloid formed from a solution of super absorbent polymers and a liquid, such as water, for use in footwear, medical, and other applications.

2. Description of the Prior Art

The search for cost effective shock absorbing and load distribution devices for various applications has been an on-going quest over the years and has resulted in a number of innovations, especially in the athletic footwear and medical fields. These innovations focused on the problems created by impact loads generated during running or walking, as well as the problems created by concentrated loads suffered by ambulatory medical patients and those using prothestic devices.

Running or jumping, especially during activities such as aerobics, causes very high localized loading of the human foot and ankle areas which can contribute to injury of the foot, ankle, associated joints such as foot, ankle and knee joints and leg bones. Consequently, product innovations in this area in recent years have rapidly developed in an effort to alleviate these problems. An added desirable feature of these innovations has been the introduction of comfort and fit improvements in the athletic footwear. Additionally, efforts to relieve the discomfort and localized injury caused by bedridden medical patients and those using load-bearing artificial limbs have been of great interest.

The typical solutions, to date, have included the use of ampules or pads formed from a flexible outer membrane hermetically filled with a liquid of an appropriate viscosity or a gas such as air, which is then inserted into the footwear or medical appliance at locations experiencing the greatest loading. Various membrane materials have been employed, as have a wide range of fillers. Filler liquids have included water, glycol mixtures, various oils and other relatively low viscosity liquids. Furthermore, higher viscosity liquids or gels, in an effort to improve the hydrostatic properties of the liquid, have incorporated semi-solids such as organosiloxane gels as the shock absorbing or load distributing material. Gas fillers have typically used enclosed pockets of air. Whereas in the past these devices used liquids, gels, or air, depending on the desired viscosity, none apparently offered the cost effective shock attenuation and load distribution performance of the present invention.

Therefore, improvements were generally sought to produce shock attenuating and load distribution devices of high durability, low cost, and ready manufacture for use in footwear, medical applications and other applications where the dissipation of load over time and/or an area is desired. To this end, as an aspect of the invention described herein, the feasibility of applying the concept of using super absorbent materials, together with an appropriate liquid, to constitute a low cost viscous colloidal fluid as the shock attenuating and load distribution material was examined. Although the theory and underlying physical phenomena represented by the non-Newtonian fluid of the present invention is now not completely understood, it was discovered that shock attenuating devices formed from a resilient membrane and filled with a super absorbent material and liquid mixture offer excellent performance characteristics in the dissipation and distribution of loading, while simultaneously offering an inexpensive and readily manufacturable product.

Previously, super absorbent materials have long been used in applications to absorb various liquids for ready and efficient disposal in articles such as diapers, sanitary napkins, bedding pads and the like. These super absorbent materials, uniquely suited to such applications, are generally hydrophilic and absorb an enormous quantity of liquid relative to its mass through capillary action.

OBJECTS OF THE INVENTION

Accordingly, it is an object of this invention to provide a cost effective shock absorbing and load distribution material for various applications, especially in the footwear and medical fields.

It is also an object of this invention to provide a material for shock absorption and load distribution for a wide variety of applications that is inexpensive, easy to handle and durable.

It is a further object of this invention to provide a padding material for shock absorption in athletic footwear.

It is a further object of this invention to provide a shock absorption and load distribution material produced by super absorbent materials comprising sodium acrylate-co-acrylamide or synthetic polymers made from acrylic acid bases.

It is also an object of this invention to provide good comfort and fit through a shock absorption and load distribution material produced by super absorbent materials in a conformable bladder having also located therein low density filler material to lower the overall bladder density.

It is another object of this invention to provide a method for the production of a shock absorption and load distribution material from super absorbent materials comprising sodium acrylate-co-acrylamide or synthetic polymers made from acrylic acid bases.

It is still another object of this invention to provide a method for the use of a shock absorption and load distribution material formed by super absorbent materials comprising sodium acrylate-co-acrylamide or synthetic polymers made from acrylic acid bases.

Other objects, advantages, and features of the present invention will become apparent upon reading the following detailed description and appended claims.

SUMMARY OF THE INVENTION

In accordance with this invention, a super absorbent material forming a thick, viscous gel-like colloidal substance of high durability, low cost, and ready manufacture can be used in footwear, medical applications, including surgical padding, flotation sleeping devices, and other applications for the dissipation of load over time and/or an area. Additionally, processes for the manufacture and use of same were developed using super absorbent materials, together with an appropriate liquid, contained within a resilient member or articulate structure, such as a conventional piston-like shock absorber, to form a viscous colloidal fluid as the shock attenuating and load distribution material. An additional feature of the present invention is the ability to control the viscosity of the colloidal fluid over an nearly infinite viscosity range.

Significantly, these desirable performance characteristics in the dissipation and distribution of dynamic and static loads are especially manifest by the use of super absorbent materials. These polymer materials are characterized by a capacity to absorb a high quantity of liquid over 50 times its own mass to form a viscous colloidal fluid easily insertable into an empty pouch or bladder for shock dissipation and load distribution. Examples of super absorbent materials include WATER-LOC A-100®, manufactured by Grain Processing Corporation, comprised of sodium acrylate-co-acrylamide as derived from corn kernel starch according to a process detailed in U.S. Pat. No. 3,661,815. Moreover, certain synthetic polymers made from acrylic acid bases can be advantageously employed. The amount of liquid which can be absorbed by super absorbent materials extends generally to ratios of about 175 milliliters of liquid to about one gram of super absorbent material, constituting a rate of absorption far greater than other, more conventional materials.

At these ratios of liquid mass to super absorbent material mass, it was discovered that a viscous colloidal fluid resulted which was easily inserted into an empty bladder or displacable structure. Moreover, it was further noted that a bladder containing such a colloidal solution of super absorbent materials and a liquid, such as water, exhibited superior damping and stress/strain characteristics ideally suited to shock dissipation and load distribution.

Alternatively, the super absorbent material can be introduced into the resilient member or displacable structure in a dry or powdered form and a liquid subsequently added to simplify manufacture. The liquid can be water, ethylene glycol, propylene glycol, various solutions of salt water, and mixtures thereof. The only requirement with respect to the liquid component is that the liquid is capable of forming a viscous colloidal fluid when mixed with the super absorbent material.

DETAILED DESCRIPTION OF THE PREFERRED EMBODIMENTS

The invention herein disclosed involves the use of super absorbent materials mixed with an appropriate liquid to form a viscous colloidal fluid which can be inserted into a sealed compartment capable of some distortion or volume displacement to absorb mechanical energy or distribute a load over a large area. Thus the present invention is based on the desire to develop a mixture that is stable when exposed to wide temperature ranges to maintain a very viscous (jelly-like) colloidal fluid as a padding or a damping device.

Several super absorbent material compositions have been developed which are suitable for this task. One preferred composition is WATER-LOC A-100® manufactured by Grain Processing Corporation, a starch-graft polymer powder fabricated from sodium acrylate-co-acrylamide. This material has the following relevant physical properties:

| Absorbency | | |
| --- | --- | --- |
| Distilled Water | (ml/g) | 175 |
| 1% NaCl Solution | (ml/g) | 50 |
| Volatiles | (%) | 3 |
| pH | | 7.7 |
| Wet-Out Time | (seconds) | 175 |
| Particle Size | | |
| On 20 mesh | (%) | <1 |
| On 40 mesh | (%) | 3 |
| On 80 mesh | (%) | 14 |
| On 120 mesh | (%) | 12 |
| On 200 mesh | (%) | 22 |
| On 270 mesh | (%) | 18 |
| On Pan | (%) | 30 |

Additionally, synthetically derived acrylic acid based polymer powders have been found useful. However, it is expected that other materials capable absorbing a liquid in amounts several times its own mass to form a viscous colloidal fluid may be developed for use according to the present invention.

The preferred super absorbent material, when mixed with the liquid to form the viscous colloidal fluid, is readily pumpable and can be first prepared and the viscous colloidal fluid subsequently injected into the sealed cavity. Alternatively, the powdered super absorbent material can first be introduced into a sealed cavity wherein the liquid is injected into the sealed cavity at a later time.

The preferred embodiment of the present invention includes the addition of agitation of the viscous colloidal fluid to form air bubbles in the space within the sealed cavity. Thus, the ratio of volume to mass can be increased and the overall density of the sealed chamber and the overall weight of the final product can be decreased. Moreover, the addition of the air bubbles adds pneumatic cushioning to the operational characteristics of the viscous colloidal fluid, which tends to improve its performance as a shock absorbing material. Alternatively, other gases may be introduced by gas injection and other means into the viscous colloidal fluid to serve the same function.

One embodiment of the present invention also includes the addition of ceramic or polystyrene balls or other low density materials to the viscous colloidal fluid to occupy space in the sealed cavity with material having a large volume and low mass. Thus, the overall density of the sealed chamber and the overall weight of the final product can be decreased.

A further feature of the present invention is that coloring can be easily added to the viscous colloidal fluid to obtain a desired color if the resilient membrane or displacable structure is transparent. The basic tan color of the preferred super absorbent material can thus be readily modified for appearance or color coordination purposes.

EXAMPLES

The following examples illustrate the use of the preferred super absorbent material with a variety of liquids. All of the following examples used an initial mixture of 65 milliliters of the stated liquid in a container containing 1 gram of the super absorbent material (obtained from a super absorbent material commonly used in disposable diapers). On the basis of these examples, it was determined that the viscosity of the viscous colloidal fluid can be predictably modified to specific needs depending on the final application by increasing or decreasing the amount of super absorbent material added relative to the type and amount of liquid utilized.

Example 1

Pure distilled or tap water showed very good absorption to form a gel-like consistency. The viscosity is readily varied by the mass percentage of super absorbent material added.

Example 2

A mixture of 65 percent water and 35 percent ethylene glycol showed reduced absorption in comparison to water, yet yielded a suitable gel-like fluid. Additional mass ratios of super absorbent material would be recommended for higher viscosities. Importantly, this liquid adds the benefit of freeze resistance to the viscous colloidal fluid.

Example 3

A mixture of 65 percent water and 35 percent propylene glycol generally showed the same behavior as ethylene glycol. However, propylene glycol showed the best behavior and is the preferred liquid owing to its relative low cost and freeze resistance, in addition to forming a colloidal fluid of the proper viscosity. Further, it was observed that when placed in an oven heated to 170° for 24 hours, the viscous colloidal fluid tended to thicken and apparently create a new polymer having characteristics different than those desired for shock absorption and load distribution.

Example 5

A liquid comprising a 1 percent sodium chloride solution of water showed reduced absorption, but still resulted in a suitable gel-like fluid.

Example 6

A liquid comprising a 3 percent sodium chloride solution of water and thus representing a higher salt content required additional super absorbent material to obtain a suitable gel-like fluid.

Example 7

A liquid comprising a 1 percent calcium chloride solution of water acted much like the 1 percent sodium chloride solution and tended to lower the freezing temperature of the viscous colloidal fluid.

Example 8

Mineral oil showed no visible absorption or thickening and is not considered a viable liquid for use with super absorbent materials.

Example 9

Corn oil showed no visible absorption or thickening and is not considered a viable liquid for use with super absorbent materials.

Example 10

Corn syrup showed no visible absorption or thickening and is not considered a viable liquid for use with super absorbent materials.

APPLICATIONS

It is intended that the greatest utility of this invention will be in bladders constructed from resilient films and filled with the viscous colloidal fluid obtained from super absorbent material mixtures. The preferred bladder material would be an outer membrane constructed of ethylene-vinyl-acetate films. Alternatively, thermoplastic urethane films, polyvinyl chloride films, chlorinated polyethylene films, Hytrel® films by DuPont, Santoprene® films by Monsanto, and other thermoplastic film laminates may be used. However, it is expected that virtually any reasonably strong flexible material will be satisfactory. Importantly, the shape and configuration of the bladder can be formed to whatever the shock absorption or load distribution application requires.

The viscous colloidal fluid as placed in a resilient bladder can be incorporated into the device to absorb shock and/or distribute load. One very beneficial application is as a component for footwear, especially athletic shoes. The bladder can be used in the shoe sole as a shock absorbing device for the mechanical energy developed by the user, or it can also be used to improve the fit and comfort of footwear by being located at other stressed portions of the footwear in proximity to the user, for example as an ankle support which is displacable within the shoe bladder as a result of lacing the shoes to a snug fit.

A further application of the bladder concept is in devices used in the medical fields, such as surgical padding, which allow the patient's body weight to be more evenly distributed over a wider area and thereby reduce the unit stress on specific portions of the body.

Additionally, the bladder can be incorporated into a padding structure for wheel chairs, thereby reducing the stress on an individual.

A further application of the present invention may be floatation sleeping devices, such as waterbeds, to minimize wave motion. As many such devices now employ complicated and expensive baffling systems, a simple viscous colloidal fluid such as disclosed by the present invention can provide a significantly reduced cost system.

Also, it is anticipated that the viscous colloidal fluid of the present invention may be advantageously employed as a damping material with an articulate structure, such as a conventional piston-like shock absorber, in various applications to dampen loads. As many such piston-like shock absorbers now use oil or other hydraulic fluids, the stress/strain characteristics of the viscous colloidal fluid of the present invention containing super absorbent material may be a less expensive alterative where the hydraulic fluid is replaced therewith.

Importantly, the viscous colloidal fluid of the present invention can be used in virtually an infinite number of other applications where the dissipation of load over time and/or an area is desired. Accordingly, the recitation of applications noted above is not to be considered a limitation of the possible applications for the present invention.

It will be understood that the details, materials and arrangements of parts of specific embodiments have been described to explain the nature of the invention. Changes may be made by those skilled in the art without departing from the invention as expressed in the appended claims.

What is claimed is:

1. A method for producing a shock absorption or load distribution device comprising a viscous colloidal fluid of a desired and controllable viscosity, the fluid substantially consisting of a super absorbent material and a compatible liquid, within a substantially non-permeable resilient cavity, the method comprising the steps of:

suspending the super absorbent material in the liquid to form the viscous colloidal fluid, wherein the desired and controllable viscosity is adjustable within a range of selectable viscosities by regulation of the ratio of the compatible liquid to the super absorbent material; and sealingly injecting the viscous fluid into the resilient cavity to form the shock absorption or load distribution device.

2. A method for producing a shock absorption or load distribution device comprising a viscous colloidal fluid of a desired and controllable viscosity within a substantially non-permeable resilient cavity, the fluid substantially consisting of a super absorbent material and a compatible liquid, the method comprising the steps of:

placing the super absorbent material into the resilient cavity, introducing the liquid into the resilient cavity to form the viscous colloidal fluid within the cavity, wherein the desired and controllable viscosity is adjustable within a range of selectable viscosities by regulation of the ratio of the compatible liquid to the super absorbent material; and sealing the resilient cavity to form the shock absorption or load distribution device.

3. The method of claim 1, comprising the additional step, after suspending the super absorbent material in the liquid to form the viscous colloidal fluid, of suspending gaseous bubbles within the viscous colloidal fluid.

4. The method of claim 2, comprising the additional step, after suspending the super absorbent material in the liquid to form the viscous colloidal fluid, of suspending gaseous bubbles within the viscous colloidal fluid.

* * * * *